(12) United States Patent
Tang et al.

(10) Patent No.: US 11,867,348 B2
(45) Date of Patent: Jan. 9, 2024

(54) ROTATING ASSEMBLY, SUPPORTING STAND, AND PHOTOGRAPHING DEVICE

(71) Applicant: PGYTECH CO., LTD., Suzhou (CN)

(72) Inventors: Jinghua Tang, Suzhou (CN); Xiuzhi Yu, Suzhou (CN)

(73) Assignee: PGYTECH CO., LTD., Suzhou Jiangsu (CN)

( * ) Notice: Subject to any disclaimer, the term of this patent is extended or adjusted under 35 U.S.C. 154(b) by 417 days.

(21) Appl. No.: 16/973,288

(22) PCT Filed: Oct. 12, 2020

(86) PCT No.: PCT/CN2020/120414
§ 371 (c)(1),
(2) Date: Dec. 8, 2020

(87) PCT Pub. No.: WO2022/047883
PCT Pub. Date: Mar. 10, 2022

(65) Prior Publication Data
US 2022/0316649 A1    Oct. 6, 2022

(30) Foreign Application Priority Data
Sep. 3, 2020    (CN) .......................... 202010915459.X

(51) Int. Cl.
*G03B 17/56* (2021.01)
*F16M 11/12* (2006.01)
*F16M 13/04* (2006.01)

(52) U.S. Cl.
CPC .......... *F16M 11/121* (2013.01); *F16M 13/04* (2013.01); *G03B 17/561* (2013.01)

(58) Field of Classification Search
CPC .... G03B 17/56; G03B 17/561; G03B 17/563; G03B 17/566; F16M 11/02; F16M 11/04; F16M 11/041; F16M 11/06; F16M 11/16; F16M 11/20; F16M 11/2007; F16M 11/22; F16M 11/24; F16M 11/242; F16M 11/245; F16M 11/247; F16M 11/34; F16M 11/36; F16M 11/38; F16M 13/02; F16M 13/022;
(Continued)

(56) References Cited

FOREIGN PATENT DOCUMENTS

| CN | 205534967 U | * | 8/2016 |
| CN | 208185809 U | * | 12/2018 |
| WO | WO-2020037819 A1 | * | 2/2020 |

* cited by examiner

*Primary Examiner* — Clayton E. LaBalle
*Assistant Examiner* — Fang-Chi Chang
(74) *Attorney, Agent, or Firm* — David G. Rosenbaum

(57) ABSTRACT

Disclosed are a rotating assembly, a supporting stand, and a photographing device. The rotating assembly includes a head adjusting structure including a first button, a first toothed disc, a second toothed disc, and a first elastic member. The first toothed disc is fixedly connected with a first head connector. The first elastic member is configured to enable teeth on the second toothed disc to mesh with teeth on the first toothed disc. The first button is configured to overcome an elastic force of the first elastic member under the action of an external force, so that the teeth on the second toothed disc are disengaged from the teeth on the first toothed disc. The angle of the first head connector fixedly connected to the first toothed disc is adjusted by using the first button, the first toothed disc, the second toothed disc, and the first elastic member.

15 Claims, 16 Drawing Sheets

(58) Field of Classification Search
CPC ............... F16M 13/04; F16M 2200/02; F16M 2200/021; F16M 2200/022; F16M 2200/08
See application file for complete search history.

ROTATING ASSEMBLY, SUPPORTING STAND, AND PHOTOGRAPHING DEVICE

CROSS-REFERENCE TO RELATED APPLICATIONS

This application claims priority to Chinese Patent Application No. 202010915459.X, filed with the Chinese Patent Office on Sep. 3, 2020, entitled "Rotating Assembly, Supporting Stand, and Photographing Device", which is incorporated herein by reference in its entirety.

TECHNICAL FIELD

The present disclosure relates to the technical field of photography and videography equipment, and in particular to a rotating assembly, a supporting stand (or holder), and a photographing device.

BACKGROUND ART

With the development of society, more and more people are enthusiastic about photography, and the functions of photographic equipment are also continuously improved accordingly. During use of a supporting structure such as a handheld photographing stand (i.e., a supporting stand) currently used in photography or videography, the angle of a photographing device mounted thereon is usually adjusted by using a separate head (e.g., a tripod head). However, the heads such as ball heads and pan heads are usually relatively expensive and thus cause a lot of economic pressure to users.

SUMMARY

The present disclosure provides a rotating assembly, which comprises a head adjusting structure including a first button, a first toothed disc, a second toothed disc, and a first elastic member, wherein the first toothed disc is connected with a first head connector, and the first elastic member is configured to enable teeth on the second toothed disc to mesh with teeth on the first toothed disc; and the first button is configured to overcome an elastic force of the first elastic member under the action of an external force, so that the teeth on the second toothed disc are disengaged from the teeth on the first toothed disc.

Optionally, the first head connector is fixedly connected to an outer circumferential surface of the first toothed disc.

Optionally, the rotating assembly further comprises a first adapter and a second adapter, wherein the first adapter comprises a first cylindrical ring having an outer circumferential surface provided with a plurality of positioning grooves distributed in its own circumferential direction, and the second adapter is equipped with a second button configured to be positionally limited in a different one of the positioning grooves to adjust an angle of rotation of the second adapter relative to the first adapter.

Optionally, the rotating assembly further comprises an angle adjusting structure, wherein the first adapter is a component of the angle adjusting structure, the angle adjusting structure further comprises a damping shaft, the first adapter further comprises an plug shaft fixedly connected to the outer circumferential surface of the first cylindrical ring, the plug shaft is connected to the damping shaft by being plugged therein, and the plug shaft and the damping shaft are circumferentially fixed to each other.

Optionally, the first adapter may further comprise a base having an arc-shaped curved surface, the arc-shaped curved surface is located in an upper surface of the base, the first cylindrical ring is fixed to the upper surface of the base, and the arc-shaped curved surface is fitted to the circular outer circumferential surface of the first toothed disc and the circular outer circumferential surface of the second adapter.

Optionally, both the first toothed disc and the second toothed disc are located between the second adapter and the first adapter, wherein the second toothed disc is located between the first toothed disc and the second adapter.

Optionally, the first head connector is provided with a first plug groove, an insertion port of the first plug groove is provided with a first stop block, and the first stop block is configured to be stretchable or retractable under an elastic action of a second elastic member.

Optionally, the first button comprises a button cap and a button handle, one end of the button handle is connected to the button cap, the first adapter has a socket configured to allow the button handle to pass therethrough, and the other end of the button handle abuts against a disc surface of the second toothed disc.

Optionally, the teeth on the second toothed disc are located on one side of the second toothed disc, and the second toothed disc has a guide post on the other opposite side thereof; the second adapter has, in one side thereof, a guide groove matched with the guide post for guiding an axial movement of the second toothed disc.

Optionally, the second adapter has a shaft hole, and the guide groove is provided in a hole wall of the shaft hole.

Optionally, one end of the first elastic member abuts against the bottom of the shaft hole, and the other end of the first elastic member abuts against a side of the second toothed disc on which the guide post is provided.

Optionally, the number of the positioning grooves is at least three, and the second button comprises a first columnar portion and a second columnar portion connected to the first columnar portion, wherein an axis of the first columnar portion is perpendicular to an axis of the second columnar portion; the first columnar portion abuts against an elastic return member for allowing detachment of the second columnar portion from one of the positioning grooves when the first columnar portion is pressed, so that the second adapter is rotatable relative to the first adapter.

Optionally, the head adjusting structure further comprises a first nylon washer, a second nylon washer, a retaining screw, a threaded sleeve, and a locking screw, and a shaft sleeve, wherein the first nylon washer is located between the first adapter and the first toothed disc, the second nylon washer is sandwiched between the first toothed disc and the second adapter, the shaft sleeve has a stop cap abutting against a side of the second adapter, the locking screw passes through a sleeve hole of the shaft sleeve and then is threadedly connected to an internal thread of the threaded sleeve, and the retaining screw is threadedly connected into a threaded hole provided at an end portion of the locking screw.

Optionally, the angle adjusting structure further comprises a third nylon washer, a fourth nylon washer, a bottom cover, and a flat-headed screw, wherein the third nylon washer is configured to be located between a disc-shaped structure of a first sub-leg of a secondary supporting leg of a supporting stand and a base of the first adapter, to achieve a damping force during rotation of the first sub-leg, the fourth nylon washer is configured to be located between a disc-shaped structure of a second sub-leg of the secondary supporting leg of the supporting stand and the disc-shaped structure of the first sub-leg, to achieve a damping force during rotation of the first sub-leg and the second sub-leg, and the bottom cover is fixedly connected to the plug shaft of the first adapter by means of the flat-headed screw.

The present disclosure further provides a supporting stand, which comprises the rotating assembly as described above.

Optionally, the supporting stand further comprises a primary supporting leg and a secondary supporting leg, wherein the primary supporting leg is fixedly connected to the second adapter; and the secondary supporting leg is connected to the first adapter.

The present disclosure further provides a photographing device, comprising an image acquisition apparatus and the supporting stand as described above, wherein the image acquisition apparatus is mounted on the supporting stand.

BRIEF DESCRIPTION OF DRAWINGS

In order to more clearly illustrate technical solutions of specific embodiments of the present disclosure or of the prior art, drawings required for use in the description of the specific embodiments or the prior art will be described briefly below. It is obvious that the drawings in the following description are illustrative of some embodiments of the present disclosure. It will be understood by those of ordinary skill in the art that other drawings can also be obtained from these drawings without any inventive effort.

REFERENCE NUMERALS

Figure 1:
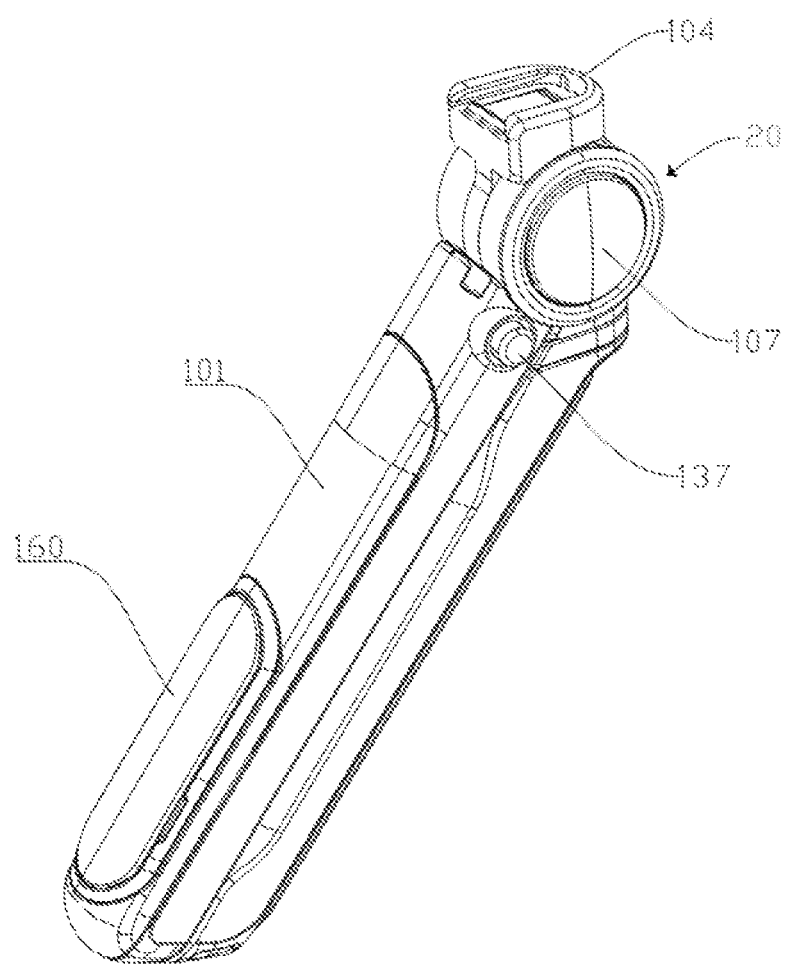
FIG. 1 is an axonometric view of a supporting stand according to an embodiment of the present disclosure.
Figure 2:
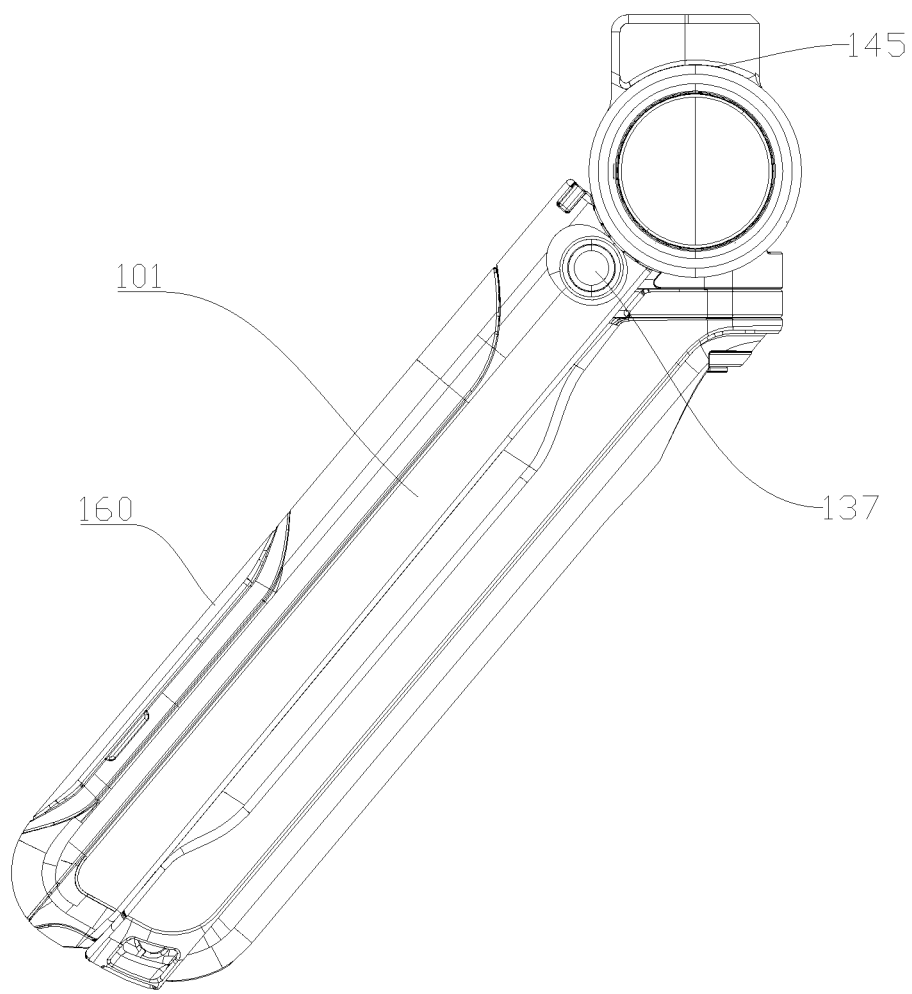
FIG. 2 is a front view of a supporting stand according to an embodiment of the present disclosure.
Figure 3:
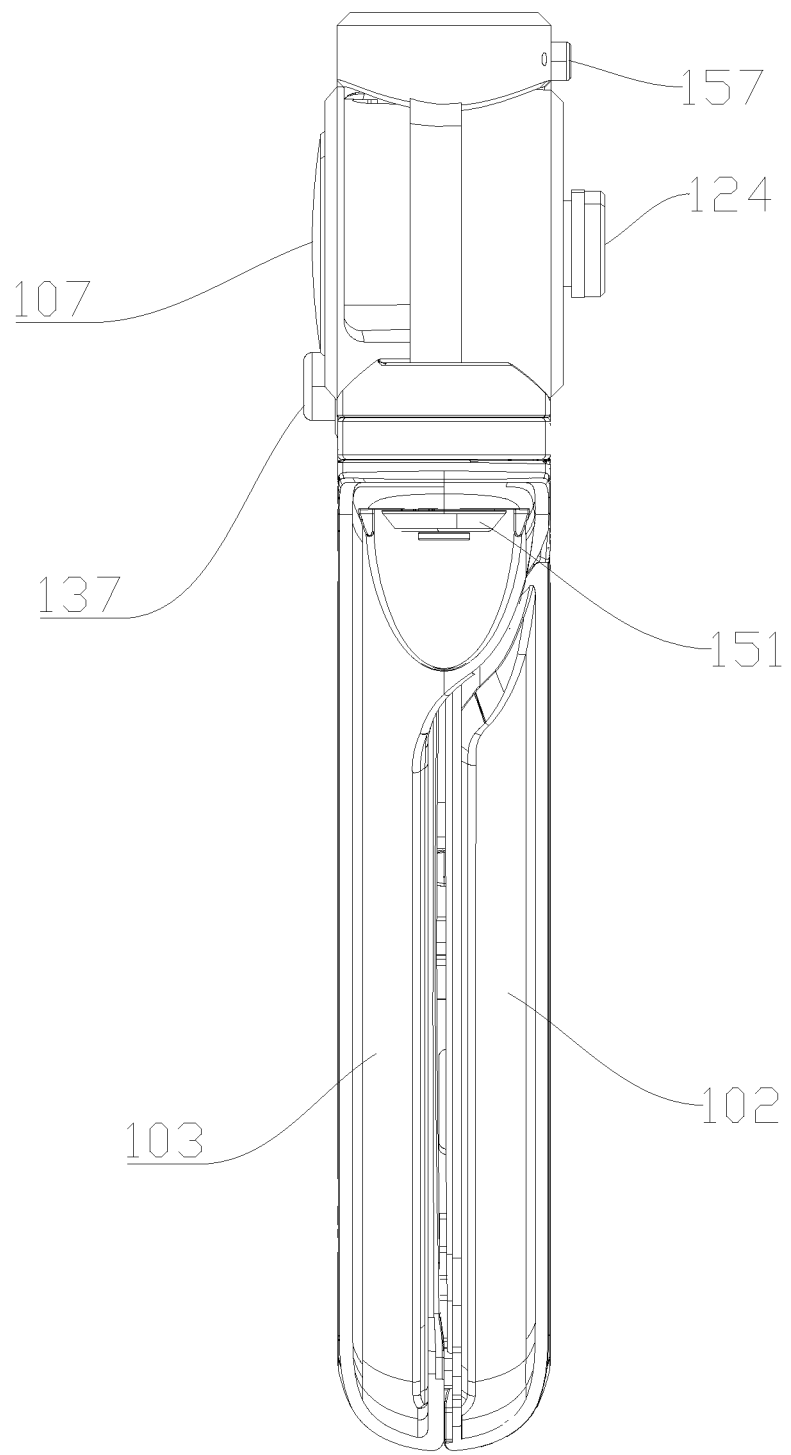
FIG. 3 is a right side view of a supporting stand according to an embodiment of the present disclosure.
Figure 4:
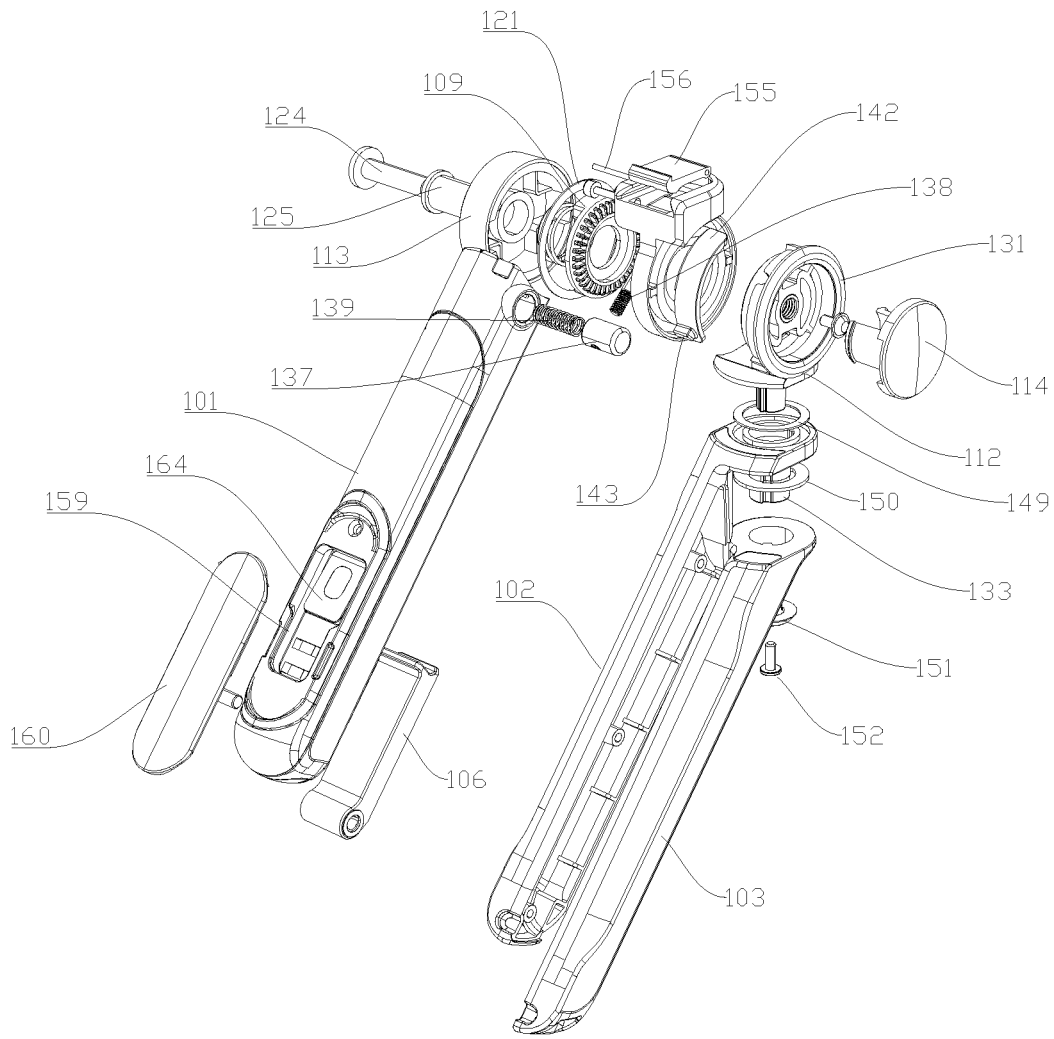
FIG. 4 is an exploded view of a supporting stand according to an embodiment of the present disclosure.
Figure 5:
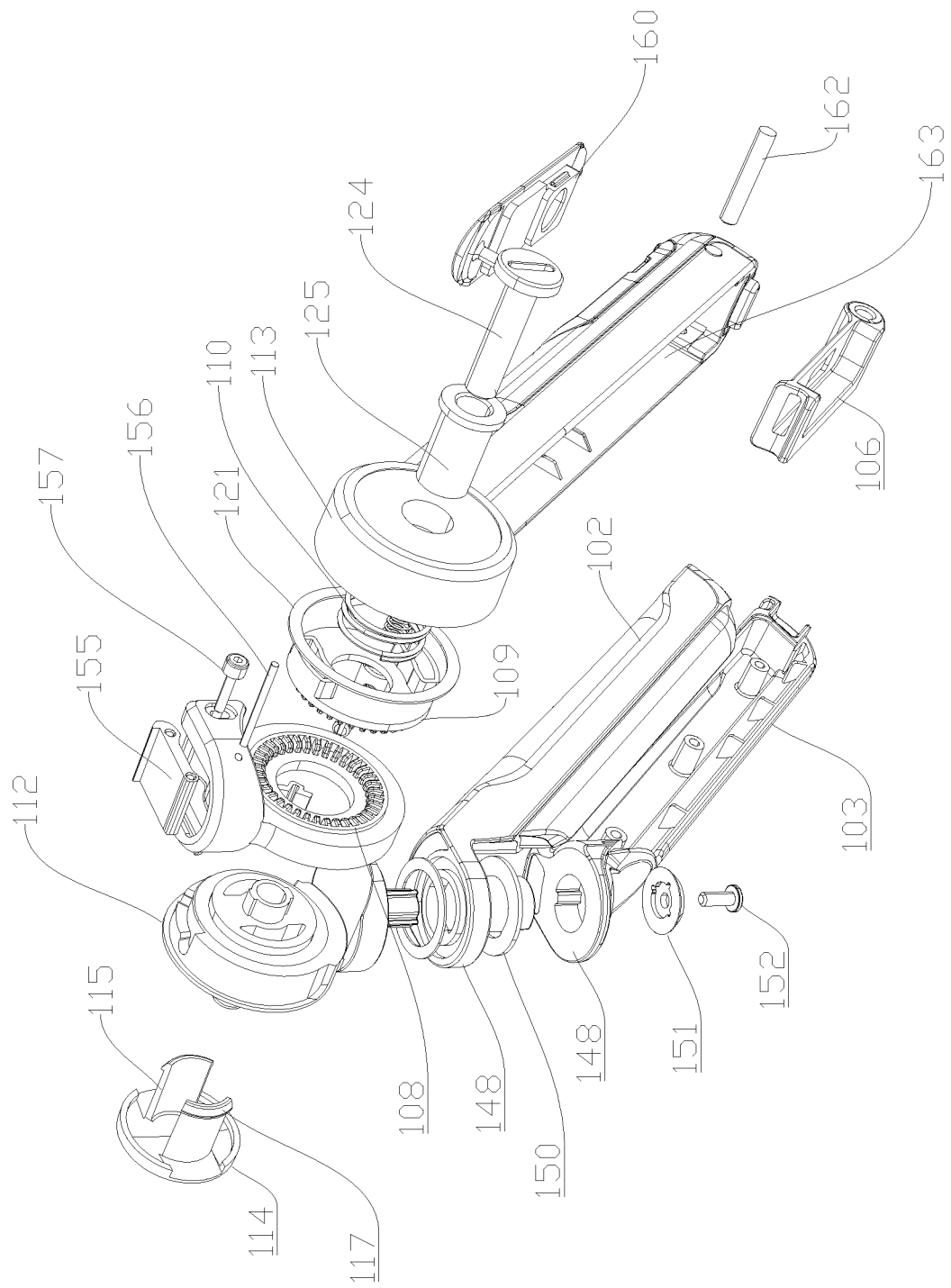
FIG. 5 is an exploded view, from another perspective, of a supporting stand according to an embodiment of the present disclosure.
Figure 6:
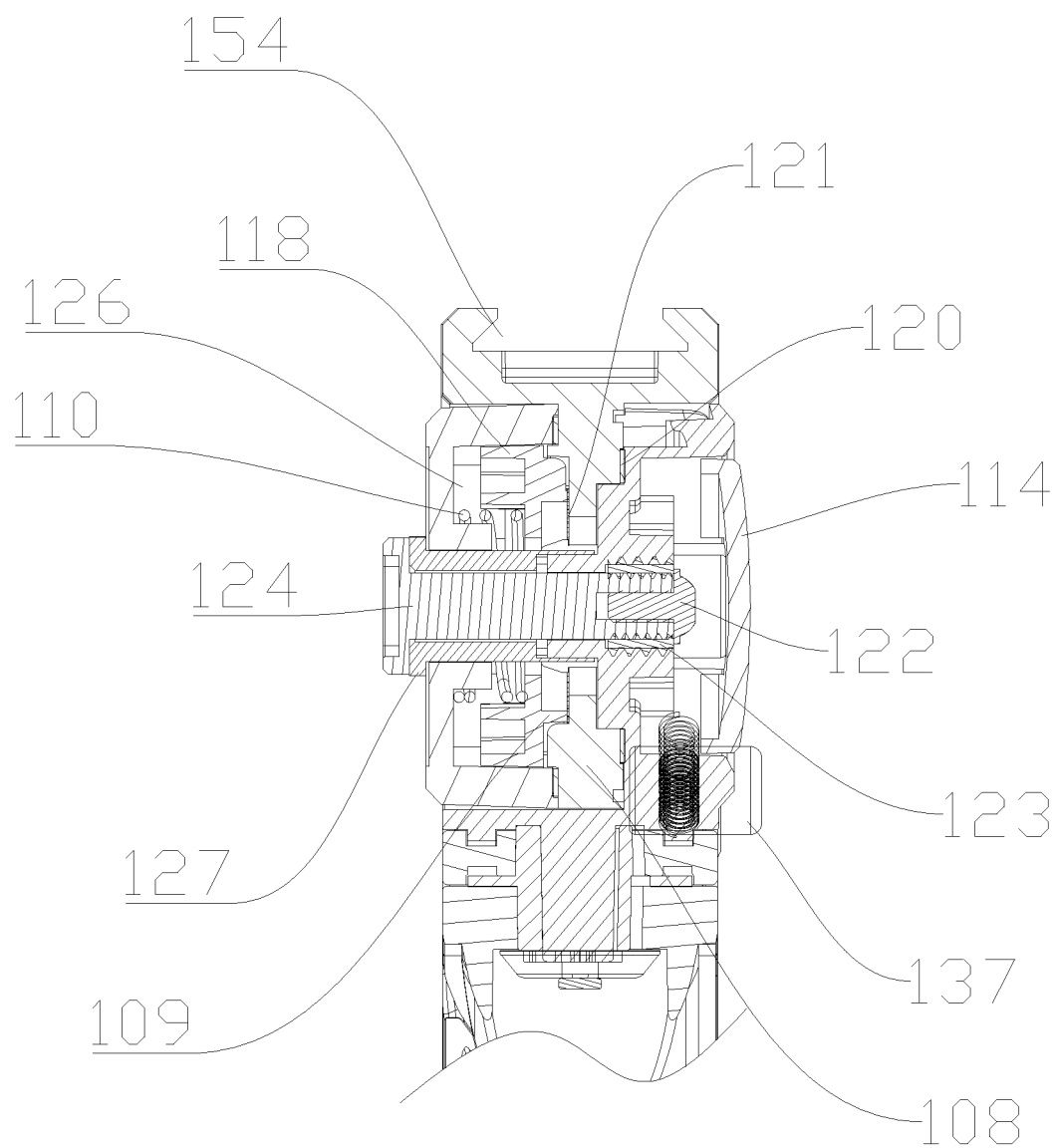
FIG. 6 is a sectional view of a partial structure of a supporting stand according to an embodiment of the present disclosure.
Figure 7:
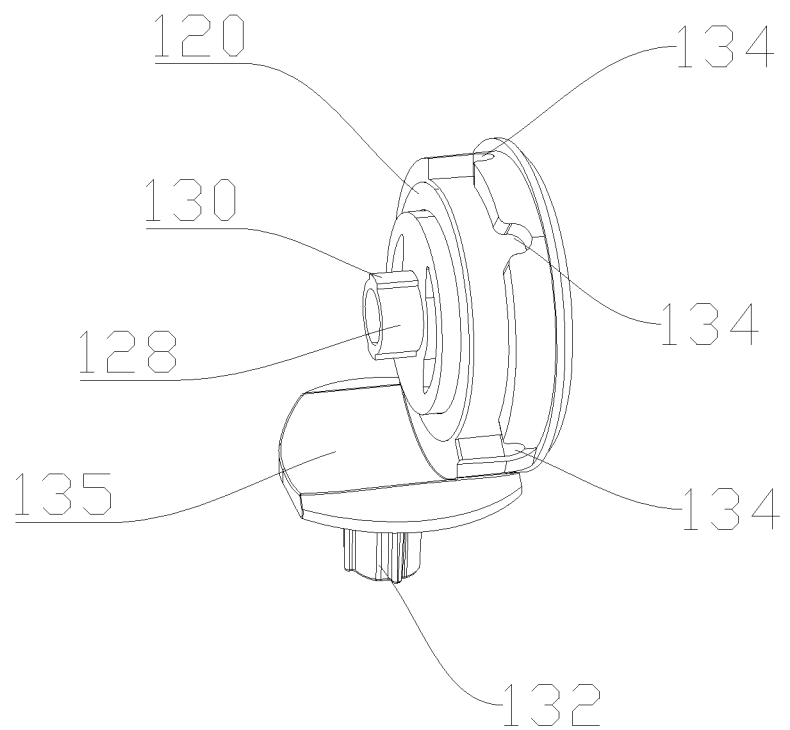
FIG. 7 is a schematic structural view of a first adapter in an embodiment of the present disclosure.
Figure 8:
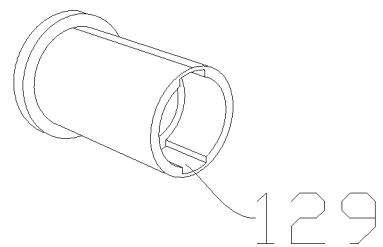
FIG. 8 is a schematic structural view of a shaft sleeve in an embodiment of the present disclosure.
Figure 9:
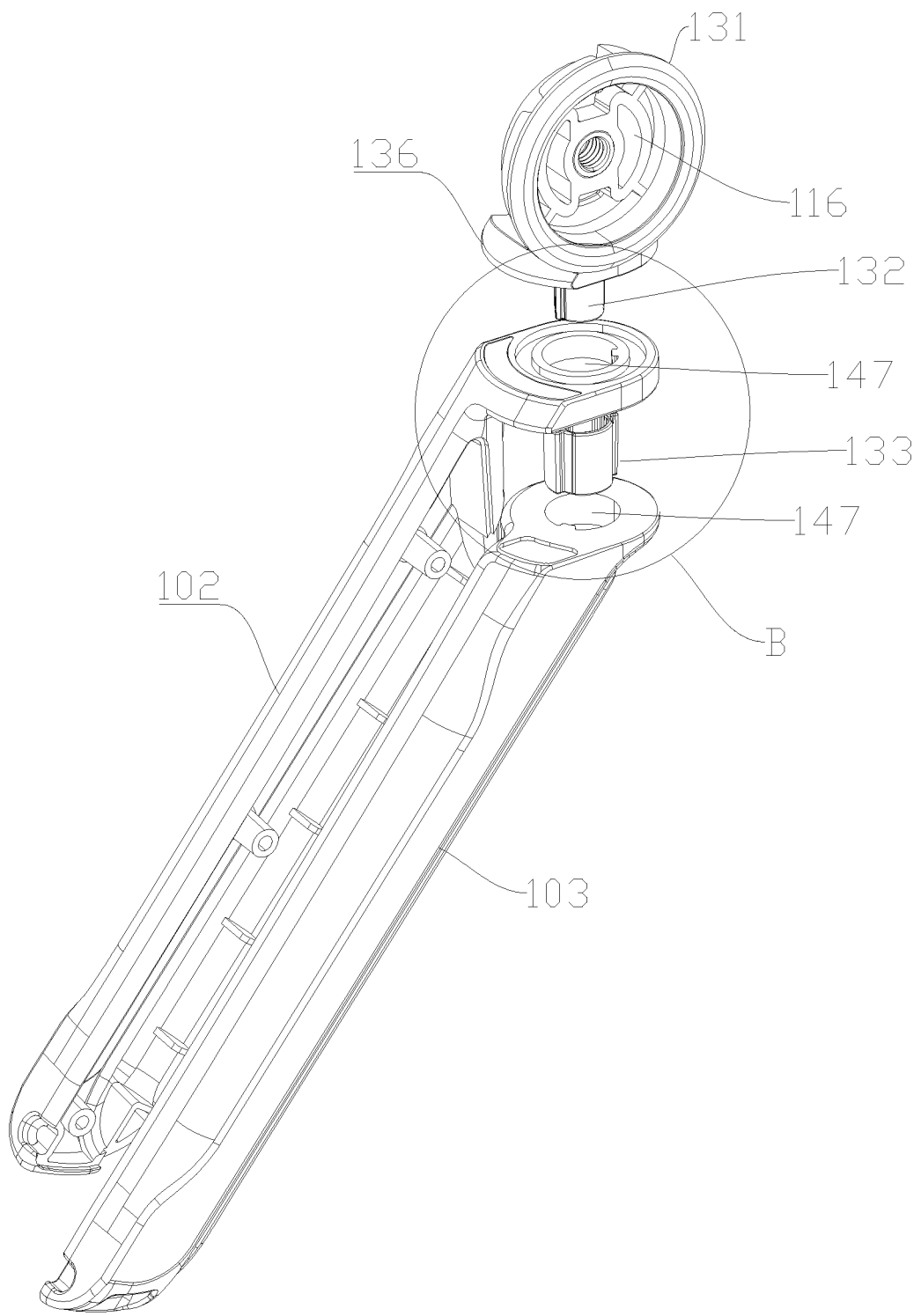
FIG. 9 is an exploded view of a first adapter, a damping shaft, a first sub-leg, and a second sub-leg in an embodiment of the present disclosure.
Figure 10:
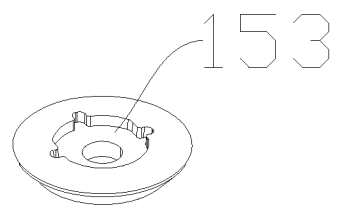
FIG. 10 is a schematic structural view of a bottom cover in an embodiment of the present disclosure.
Figure 11:
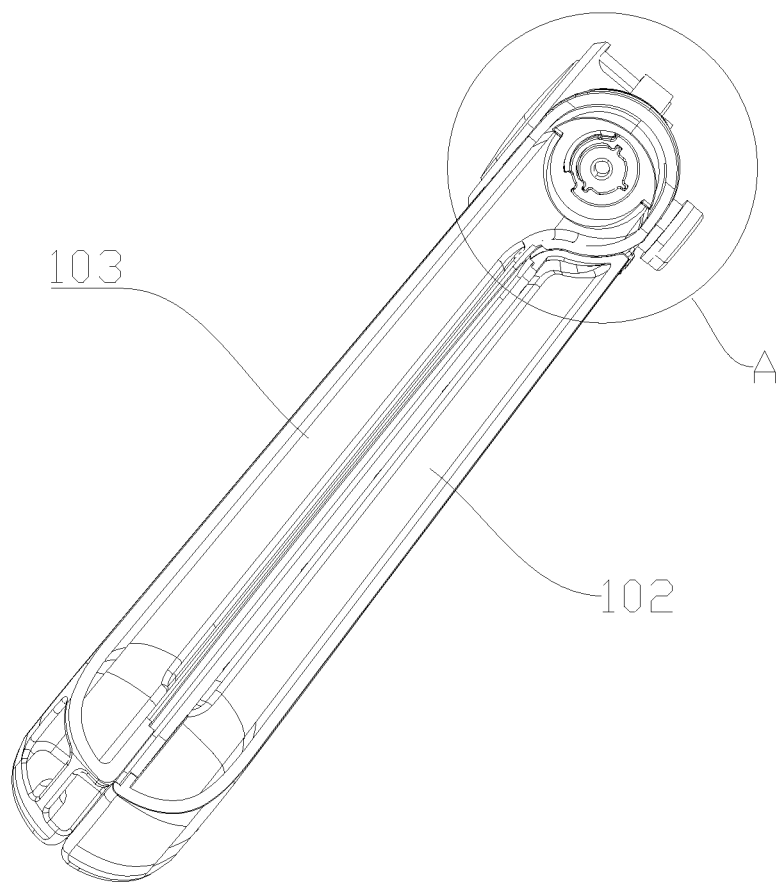
FIG. 11 is a schematic structural view showing the assembling relationship between a first adapter, a damping shaft, a first sub-leg, and a second sub-leg in an embodiment of the present disclosure when viewed from bottom to top (a flat-headed screw and a bottom cover are removed)
Figure 12:
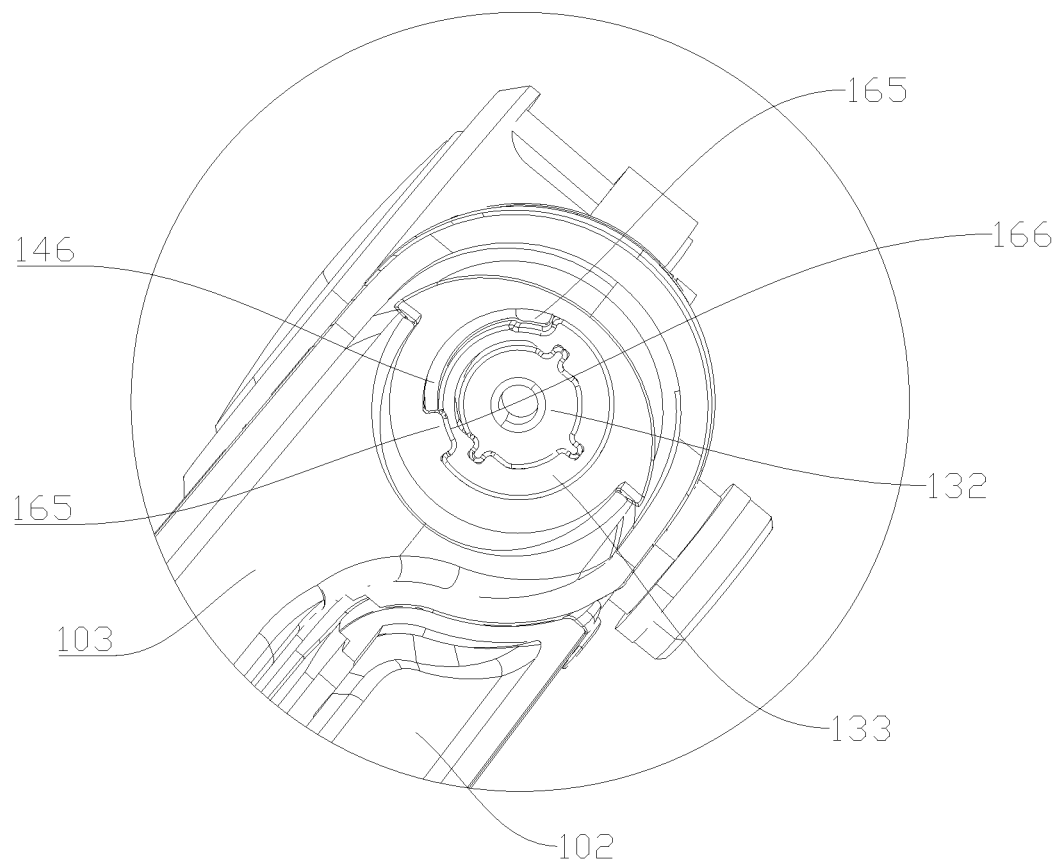
FIG. 12 is a schematic partial enlarged view of part A in FIG. 11.
Figure 13:
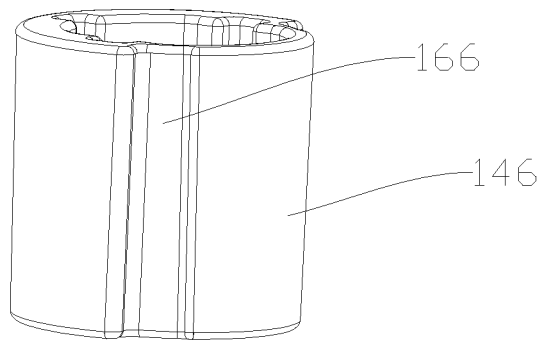
FIG. 13 is a schematic structural view of a damping shaft in an embodiment of the present disclosure.
Figure 14:
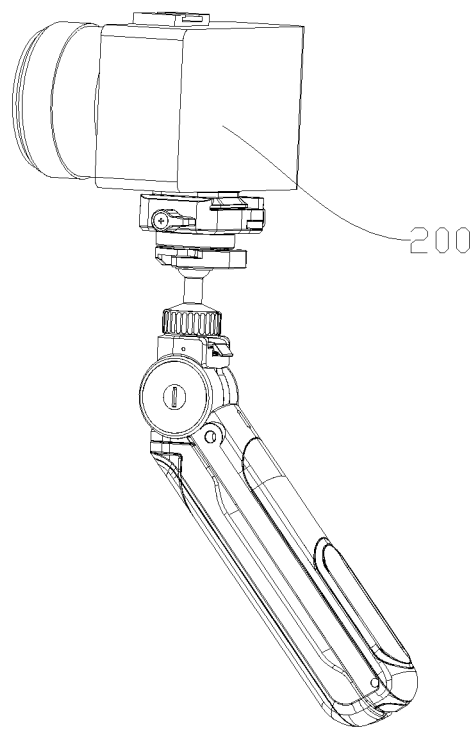
FIG. 14 is a schematic structural view of an image acquisition apparatus mounted on a supporting stand by means of a head in an embodiment of the present disclosure (handheld mode)
Figure 15:
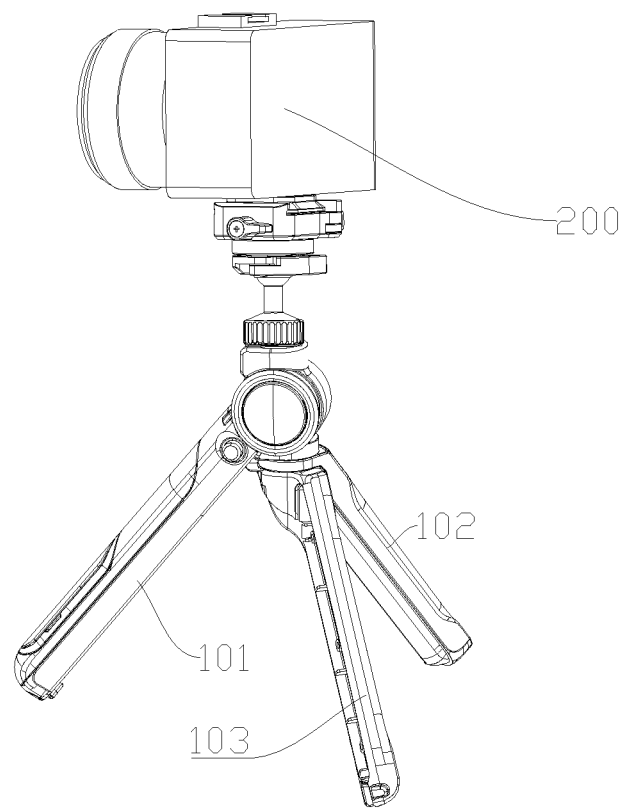
FIG. 15 is a schematic structural view of an image acquisition apparatus mounted on a supporting stand in an embodiment of the present disclosure (high-position three-leg support mode)
Figure 16:
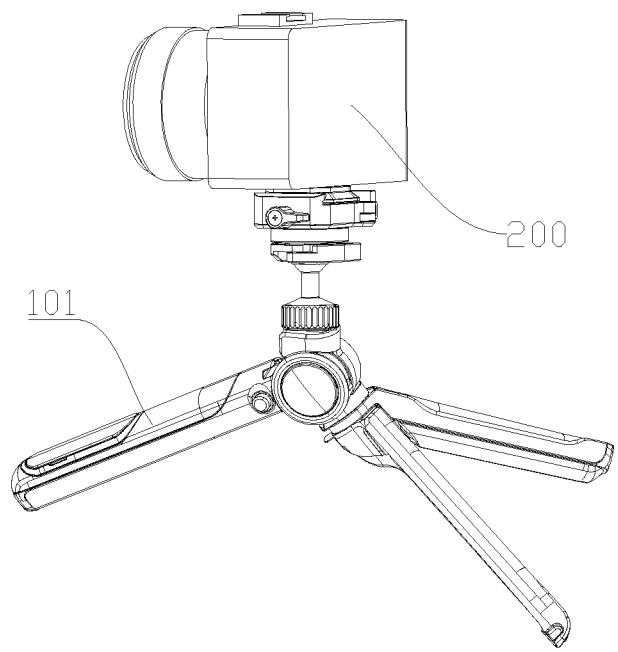
FIG. 16 is a schematic structural view of an image acquisition apparatus mounted on a supporting stand in an embodiment of the present disclosure (low-position three-leg support mode)
Figure 17:
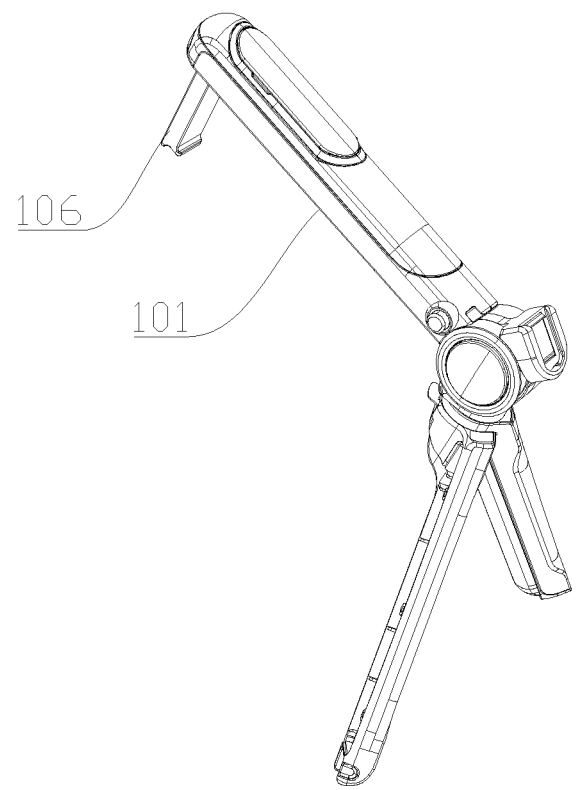
FIG. 17 is a schematic structural view of a supporting stand in a hung state in an embodiment of the present disclosure.

10—supporting leg assembly; 20—supporting leg adjusting structure; 101—primary supporting leg; 201—secondary supporting leg; 102—first sub-leg; 103—second sub-leg; 104—first head connector; 105—second head connector; 106—stopper; 107—first button; 108—first toothed disc; 109—second toothed disc; 110—first elastic member; 210—second elastic member; 310—third elastic member; 112—first adapter; 113—second adapter; 114—button cap; 115—button handle; 116—socket; 117—first protrusion; 118—guide post; 119—guide groove; 120—first nylon washer; 121—second nylon washer; 122—retaining screw; 123—threaded sleeve; 124—locking screw; 125—shaft sleeve; 126—shaft hole; 127—stop cap; 128—positioning shaft; 129—anti-rotation groove; 130—anti-rotation protrusion; 131—first cylindrical ring; 132—plug shaft; 133—damping shaft; 134—positioning groove; 135—arc-shaped curved surface; 136—base; 137—first columnar portion; 138—second columnar portion; 139—elastic return member; 140—button hole; 141—lateral hole; 142—shield; 143—protruding portion; 144—recessed portion; 145—arcuate surface; 146—first limiting groove; 147—damping hole; 148—disc-shaped structure; 149—third nylon washer; 150—fourth nylon washer; 151—bottom cover; 152—flat-headed screw; 153—recessed hole; 154—first plug groove; 155—first stop block; 156—first pin shaft; 157—second pin shaft; 159—second plug groove; 160—leg cover; 162—fifth pin shaft; 163—sunken groove; 164—second stop block; 165—first limiting rib; 166—positioning clamping slot; 200—image acquisition apparatus; 300—host; 100—rotating assembly.

DETAILED DESCRIPTION OF EMBODIMENTS

The technical solutions of the present disclosure will be described below clearly and completely with reference to the accompanying drawings. It is apparent that the embodiments to be described are some, but not all of the embodiments of the present disclosure.

Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure.

All the other embodiments obtained by those of ordinary skill in the art in light of the embodiments of the present disclosure without inventive efforts will fall within the scope of the present disclosure as claimed.

In the description of the present disclosure, it should be noted that orientation or positional relationships indicated by the terms such as "center", "up", "down", "left", "right", "vertical", "horizontal", "inside", and "outside" are the orientation or positional relationships shown based on the figures, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, the terms "first", "second", and "third" are used for descriptive purposes only, and should not be understood as an indication or implication of relative importance.

In the description of the present disclosure, it should be noted that the terms "mount", "link", and "connect" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

The present disclosure provides a rotating assembly, a supporting stand, and a photographing device, so as to solve the problem that the angle of a photographing device mounted on a supporting structure currently used in photography or videography, when in use, is usually adjusted by a separate expensive head, and to reduce economic pressure on users to a certain extent.

The present disclosure includes, for example, the following advantageous effects.

A first button, a first toothed disc, a second toothed disc, and a first elastic member are used in the rotating assembly, the supporting stand, and the photographing device according to the present disclosure, so as to adjust the angle of a first head connector fixedly connected to the first toothed disc, so that the angle of an external device, such as an image acquisition apparatus, mounted on the first head connector can be adjusted without using a head, thereby saving the cost.

Referring to FIGS. 1 to 21, an embodiment of the present disclosure provides a supporting stand, which comprises a first head connector 104 and a supporting leg assembly 10 connected to the first head connector 104. The supporting leg assembly 10 comprises a primary supporting leg 101 and a secondary supporting leg 201. A supporting leg adjusting structure 20 is disposed between the primary supporting leg 101 and the secondary supporting leg 201 for unlocking or locking the primary supporting leg 101 and the secondary supporting leg 201 relative to each other, so that the primary supporting leg 101 and the secondary supporting leg 201 can move or remain stationary relative to each other. The secondary supporting leg 201 may comprise a first sub-leg 102 and a second sub-leg 103, and the first sub-leg 102 and the second sub-leg 103 can be unfolded or closed relative to each other. When the first sub-leg 102 and the second sub-leg 103 are unfolded relative to each other, a three-leg support (or tripod) state can be created by the primary supporting leg 101, the first sub-leg 102, and the second sub-leg 103.

The relative movement between the primary supporting leg 101 and the secondary supporting leg 201 may refer to a motion such as rotation or folding of the primary supporting leg 101 relative to the secondary supporting leg 201, so that an angle formed between the length direction of the primary supporting leg 101 and the length direction of the secondary supporting leg 201 is adjustable. In other words, an opening angle between the primary supporting leg 101 and the secondary supporting leg 201 is adjustable. The supporting leg adjusting structure 20 has the function of unlocking and locking. In other words, the opening angle between the primary supporting leg 101 and the secondary supporting leg 201 when unlocked can be adjusted as required. After a desired angle is obtained, the desired angle between the primary supporting leg 101 and the secondary supporting leg 201 is maintained by the locking function. In other words, the desired angle is kept unchanged. The primary supporting leg 101 may be closed toward the secondary supporting leg 201, so that the supporting stand is easily stored and less space is occupied by the supporting stand.

The first sub-leg 102 and the second sub-leg 103 may be unfolded or closed by a motion such as relative rotation or folding. When the first sub-leg 102 and the second sub-leg 103 are closed toward each other, the supporting stand is easily stored and less space is occupied by the supporting stand. After the opening angle between the primary supporting leg 101 and the secondary supporting leg 201 is properly adjusted, the first sub-leg 102 and the second sub-leg 103 are unfolded so that a commonly used three-leg support state is created by the primary supporting leg 101, the first sub-leg 102, and the second sub-leg 103, by which an image acquisition apparatus 200 can be supported.

When the image acquisition apparatus 200 itself is provided with an interface structure matching the first head connector 104 in this embodiment, the image acquisition apparatus 200 may be directly mounted on the first head connector 104. When the image acquisition apparatus 200 has no interface structure matching the first head connector 104, it may be mounted to the first head connector 104 in an indirect manner, that is, by using an indirect mounting structure. For example, the image acquisition apparatus 200 is mounted to the first head connector 104 by means of an available mounting structure such as a quick release plate, a head, or a mounting clip.

It should be noted that the secondary supporting leg may comprise not only two sub-legs, i.e., the first sub-leg 102 and the second sub-leg 103, but the secondary supporting leg may comprise three, four, five, or more sub-legs.

In the supporting stand according to an embodiment of the present disclosure, the primary supporting leg 101 and the secondary supporting leg 201 can be conveniently unlocked and locked relative to each other by the supporting leg adjusting structure 20. Moreover, the secondary supporting leg 201 comprises a first sub-leg 102 and a second sub-leg 103, which can be unfolded or closed, so that a three-leg support can be achieved by the three legs. In this way, when the supporting stand is held in a user's hand for a long time, the first sub-leg 102 and the second sub-leg 103 can be unfolded, so that the user's hands can be freed by using the three-leg support and that the supporting stand can have diversified functions in use.

Figure 19:
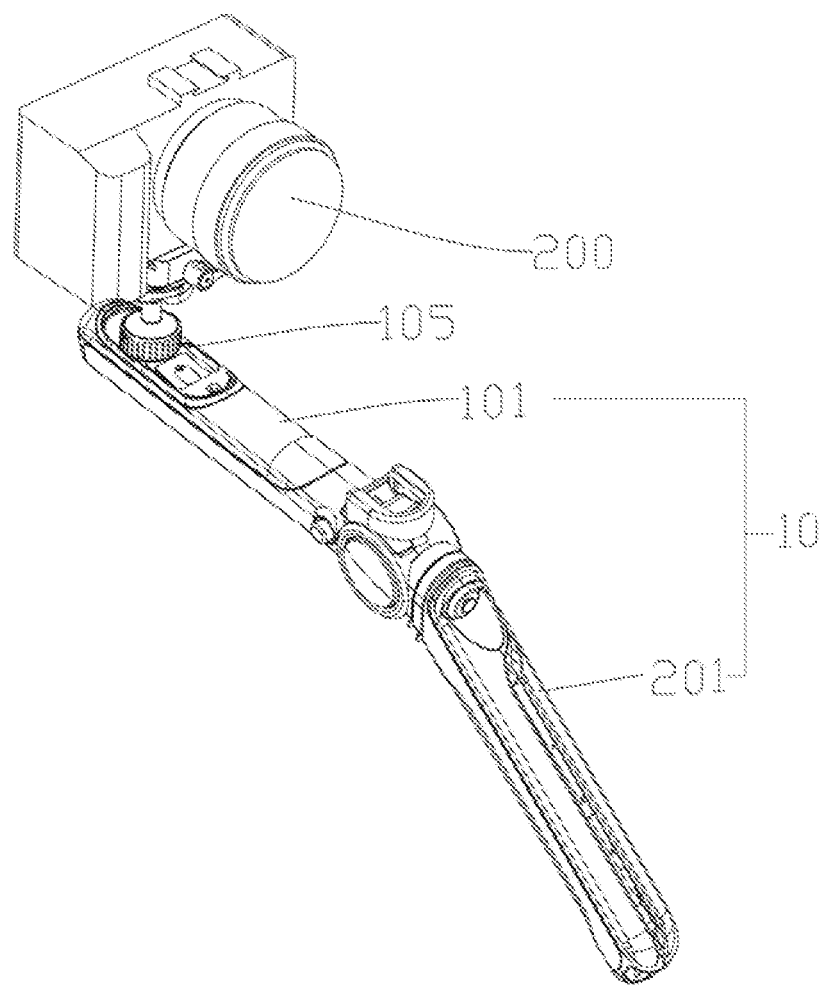
FIG. 19 is a schematic structural view of an image acquisition apparatus mounted on a supporting stand in an embodiment of the present disclosure (lengthened handheld mode)
Figure 20:
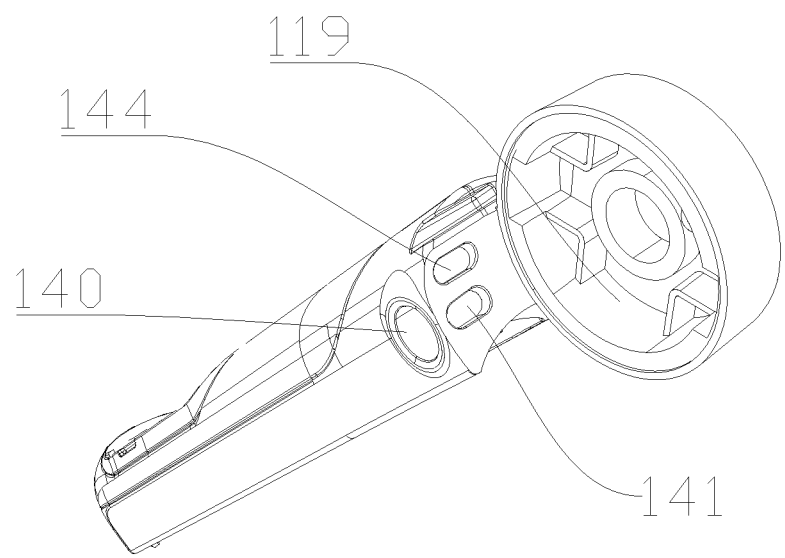
FIG. 20 is a schematic structural view showing the connection of a primary supporting leg and a second adapter in an embodiment of the present disclosure.
Figure 21:
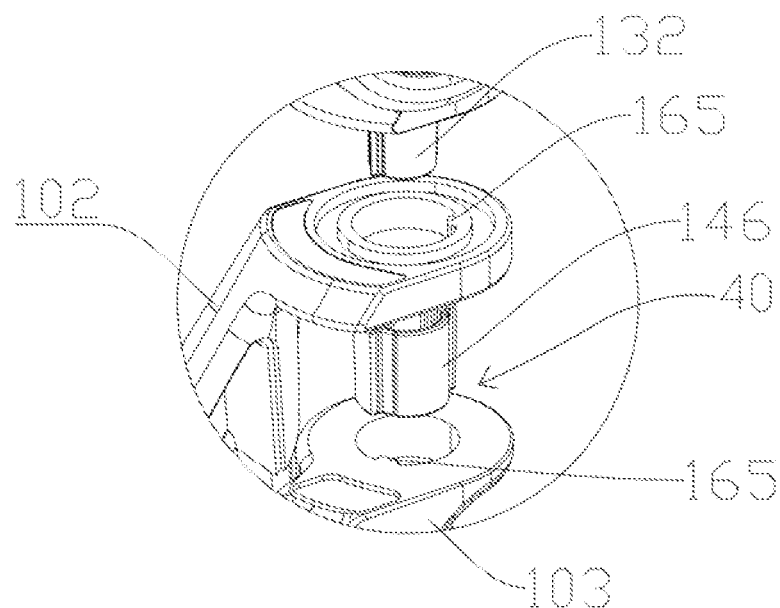
FIG. 21 is a schematic partial enlarged view of part B in FIG. 9.

In an optional solution of this embodiment, one end of the primary supporting leg 101, one end of the first sub-leg 102, and one end of the second sub-leg 103 are connected to one another, to form an end connection position at which the first head connector 104 is disposed. The end connection position may refer to the spatial position of the first head connector 104 on the supporting stand. As shown in FIG. 19, the supporting stand may further comprise a second head connector 105. The second head connector 105 is disposed on the primary supporting leg 101. The second head connector 105 may be disposed in the middle of the primary supporting leg 101, or at the other end of the primary supporting leg 101, or at a position close to the other end of the primary supporting leg 101. The image acquisition apparatus 200 can be mounted at a different position on the supporting stand by means of the second head connector 105, to meet different usage requirements.

It should be noted that, optionally, the first head connector 104 may be disposed on the primary supporting leg 101, and the second head connector 105 may be disposed at the end connection position that is formed by connecting one end of the primary supporting leg 101, one end of the first sub-leg 102, and one end of the second sub-leg 103 to one another.

Figure 18:
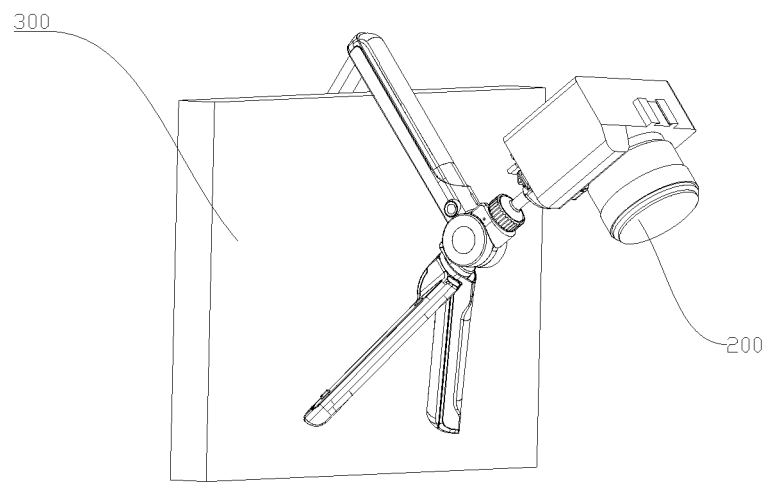
FIG. 18 is a schematic structural view of an image acquisition apparatus mounted on a supporting stand in an embodiment of the present disclosure (hung mode)

In an optional solution of this embodiment, the supporting stand further comprises a stopper 106. The stopper 106 is disposed on at least the primary supporting leg 101 for enabling the supporting stand to be hung on a host 300 (as shown in FIG. 18). The supporting stand can be hung on the host 300 by means of the stopper 106, so that the user's hands can be freed on the one hand, and different photographing requirements can be achieved on the other hand. The host 300 may be a wall, a board, a shelf, or any other structure on which the supporting stand can be hung in such a manner that the supporting stand is brought into a stable state. This can prevent shaking of the image acquisition apparatus 200 or falling of the supporting stand from the host 300 due to instability of the supporting stand.

It should be noted that at least one of the first sub-leg 102 and the second sub-leg 103 may also be provided with a stopper 106 to enable the supporting stand to be hung on the host 300.

In an optional solution of this embodiment, the supporting stand further comprises a head adjusting structure for adjusting an angle of rotation of the first head connector 104 relative to the primary supporting leg 101. The rotation angle, such as the pitch angle, of the first head connector 104 is advantageously adjusted by the head adjusting structure, so as to meet the requirements in photographing, for example, a low-angle shot, a high-angle shot, or an eye-level shot. It should be noted that when the supporting stand is placed in an altered direction, the pitch angle may be changed to a heading angle or may be changed into another state, but the rotation angle of the first head connector 104 is still altered.

In an optional solution of this embodiment, the head adjusting structure comprises a first button 107, a first toothed disc 108, a second toothed disc 109, and a first elastic member 110. The first toothed disc 108 is fixedly connected to the first head connector 104. The first elastic member 110 is configured to enable teeth on the second toothed disc 109 to mesh with teeth on the first toothed disc 108. The first button 107 is configured to overcome an elastic force of the first elastic member 110 under the action of an external force, so that the teeth on the second toothed disc 109 are disengaged from the teeth on the first toothed disc 108.

The first toothed disc 108 may be structurally integrated with the first head connector 104, so that the safety and stability of an external device such as the image acquisition apparatus 200 connected to the first head connector 104 can be ensured during use. The first elastic member 110 may be a spring. The first elastic member 110 applies a force to the second toothed disc 109, so that the teeth on the second toothed disc 109 can mesh with the teeth on the first toothed disc 108. Each of the first toothed disc 108 and the second toothed disc 109 has multiple teeth, and the multiple teeth may be distributed in a circle. In other words, a circle is formed by the multiple teeth. When in use, the user presses the first button 107, such that the first button 107 can be moved in a first direction against the elastic force of the first elastic member 110, so that the first elastic member 110 is compressed, and finally the teeth on the second toothed disc 109 are no longer meshed with the teeth on the first toothed disc 108. At this time, the rotation angle of the first head connector 104 can be adjusted. When the external force is removed, in other words, when the user no longer applies a force to the first button 107, the elastic potential energy of the uncompressed first elastic member 110 is released such that the second toothed disc 109 is moved in a direction toward the first toothed disc 108, so that the teeth on the second toothed disc 109 mesh with the teeth on the first toothed disc 108, to lock the first head connector 104, so that it cannot rotate freely.

In an optional solution of this embodiment, the supporting stand further comprises a first adapter 112 and a second adapter 113, wherein the first adapter 112 is connected to the secondary supporting leg 201, and the second adapter 113 is fixedly connected to the primary supporting leg 101. Both the first toothed disc 108 and the second toothed disc 109 are located between the second adapter 113 and the first adapter 112, wherein the second toothed disc 109 is located between the first toothed disc 108 and the second adapter 113. The first adapter 112 and the second adapter 113 are disposed to facilitate the rotation of the primary supporting leg 101 and the secondary supporting leg relative to each other.

In an optional solution of this embodiment, the first head connector 104 is fixedly connected to the outer circumferential surface of the first toothed disc 108.

In an optional solution of this embodiment, the first button 107 comprises a button cap 114 and a button handle 115, wherein one end of the button handle 115 is connected to the button cap 114, the first adapter 112 has a socket 116 allowing the button handle 115 to pass therethrough, and the other end of the button handle 115 abuts against a disc surface of the second toothed disc 109. The button cap 114 can be easily pressed by a finger. When the button cap 114 is pressed, the button handle 115 can make the second toothed disc 109 move, so that the teeth on the second toothed disc 109 are disengaged from the teeth on the first toothed disc 108.

The button cap 114 may be in a circular or polygonal or other shape. There are two button handles 115. The button handles 115 each have an arc-shaped radial section, and the radial direction of each of the button handles 115 is parallel to the radial direction of the button cap 114. The sockets 116 in the first adapter 112 may be arc-shaped, such that the button handles 115 are fitted therein. The two button handles 115 are arranged symmetrically on one side of the button cap 114. Optionally, the button handles 115 each have a first protrusion 117 at the other end thereof. The first protrusion 117 extends in the radial direction of the button handle 115 for positionally limiting the button handle 115 into the first adapter 112. Moreover, the button handles 115 have a certain degree of elasticity. When it is necessary to assemble the button handles 115 into the first adapter 112, the two button handles 115 are pinched, and the button handles 115 are allowed to pass through their respective corresponding sockets 116, and the first protrusions 117 are also allowed to pass through the first sockets 116. After the first protrusions pass through the sockets, the two button handles 115 are released so that the button handles 115 are restored to the original state under the action of elasticity. The first protrusions 117 act as a stopper to prevent detachment of the button handles 115 from the first adapter 112. The two button handles 115 and the two sockets 116 are provided, so as to guide the movement of the first button 107 and prevent a rotation of the first button 107 about an axis parallel to the first direction.

In an optional solution of this embodiment, the teeth on the second toothed disc 109 are located on one side of the second toothed disc 109, and the second toothed disc 109 has a guide post 118 on the other opposite side thereof. The second adapter 113 has, in a side thereof, a guide groove 119 matched with the guide post 118 for guiding the axial movement of the second toothed disc 109. The guide post 118 and the guide groove 119 can prevent a rotation of the second toothed disc 109 relative to the second adapter 113. In other words, the second toothed disc can be fixed to the second adapter in the circumferential direction.

The head adjusting structure further comprises a first nylon washer 120, a second nylon washer 121, a retaining screw 122, a threaded sleeve 123, a locking screw 124, and a shaft sleeve 125. The first nylon washer 120 and the second nylon washer 121 each are in a ring shape. The first nylon washer 120 is located between the first adapter 112 and the first toothed disc 108. In other words, the two opposite sides of the first nylon washer 120 are in contact with the first adapter 112 and the first toothed disc 108, respectively. The second adapter 113 has a shaft hole 126, and the guide groove 119 is provided in a hole wall of the shaft hole 126. The maximum outer diameter of the second toothed disc 109 is smaller than the inner diameter of the shaft hole 126, so that the second toothed disc 109 is movable in the shaft hole 126. The inner ring diameter of the second nylon washer 121 is larger than the maximum outer diameter of the second toothed disc 109. The second nylon washer 121 is sandwiched between the first toothed disc 108 and the second adapter 113. In other words, the two opposite sides of the second nylon washer 121 are in contact with the first toothed disc 108 and the second adapter 113, respectively. After being provided with the first nylon washer 120 and the second nylon washer 121, the first toothed disc 108 has a certain damping force when driving the rotation of the first head connector 104. One end of the shaft sleeve 125 has a stop cap 127. The other end of the shaft sleeve 125 is inserted through a mounting through hole in the second adapter 113 and then passes through a mounting through hole in the second toothed disc 109, and then is connected to a positioning shaft 128 disposed on a side of the first adapter 112 in a manner of insertion. An anti-rotation groove 129 is provided in the inner wall of the hole of the shaft sleeve 125, and the positioning shaft 128 is provided with an anti-rotation protrusion 130 matching the anti-rotation groove 129. When the positioning shaft 128 on the first adapter 112 is inserted into the shaft sleeve 125, relative rotation of the shaft sleeve 125 and the first adapter 112 are prevented by the anti-rotation protrusion 130 and the anti-rotation groove 129. The threaded sleeve 123 has an external thread threadedly connected into a threaded hole provided in the first adapter 112. The locking screw 124 passes through the sleeve hole of the shaft sleeve 125 and then is threadedly connected to an internal thread of the threaded sleeve 123, and the retaining screw 122 is threadedly connected into a threaded hole provided at an end portion of the locking screw 124. The shaft sleeve 125 has a stop cap 127 that can be in contact with a side of the second adapter. The retaining screw 122 can prevent detachment of the locking screw 124 from the shaft sleeve 125. The first adapter 112 and the second adapter 113 are connected together by means of the locking screw 124, the shaft sleeve 125, the threaded sleeve 123, and the retaining screw 122, and the second adapter 113 is rotatable relative to the first adapter 112. The first direction is parallel to the axial direction of the shaft sleeve 125. One end of the first elastic member 110 abuts against the bottom of the shaft hole 126, and the other end of the first elastic member 110 abuts against the side of the second toothed disc 109 on which the guide post 118 is provided. It should be noted that the threaded sleeve 123 may be structurally integrated with the first adapter 112. In other words, a threaded hole that matches the external thread of the locking screw 124 is provided in the first adapter. In addition, the prevention of detachment of the locking screw 124 from the shaft sleeve 125 is not limited to being achieved in the manner described herein. The retaining screw may be embodied as another fastener which may be a circlip (i.e., a retaining ring) or a pin that may be a split pin. When a circlip is used, an anti-detachment clamping slot may be provided at an end portion of the locking screw in the circumferential direction. After the end portion of the locking screw at which the anti-detachment clamping slot is provided is extended from the threaded sleeve 123, the circlip is engaged into the anti-detachment clamping slot, whereby the detachment of the locking screw can be prevented. When a pin is used, a radial perforation may be provided at an end portion of the locking screw. After the end portion of the locking screw at which the radial perforation is provided is extended from the threaded sleeve 123, the pin is inserted into the radial perforation, whereby the detachment of the locking screw can be prevented.

In an optional solution of this embodiment, the first adapter 112 may be a component of the supporting leg adjusting structure. The first adapter 112 comprises a first cylindrical ring 131 and a plug shaft 132 fixedly connected to the outer circumferential surface of the first cylindrical ring 131. The plug shaft 132 is connected to a damping shaft 133 by being plugged therein, and the plug shaft 132 and the damping shaft 133 are circumferentially fixed to each other. The outer circumferential surface of the first cylindrical ring 131 has a plurality of positioning grooves 134 distributed in its own circumferential direction. A second button may be mounted indirectly or directly to the second adapter 113. For example, if the second button is mounted to the primary supporting leg 101, the second button is mounted indirectly to the second adapter 113. The primary supporting leg 101 is provided with a second button which can be positionally limited in different positioning grooves 134, so as to adjust the opening angle between the primary supporting leg 101 and the secondary supporting leg 201, that is, so as to adjust the angle of rotation of the second adapter 113 relative to the first adapter 112.

It should be noted that the second button may also be mounted to another structure connected to the second adapter 113.

The first adapter 112 may further comprise a base 136 having an arc-shaped curved surface 135. The arc-shaped curved surface 135 is located in the upper surface of the base 136. The first cylindrical ring 131 is fixed to the upper surface of the base 136. The plug shaft 132 is fixed to the lower surface of the base 136. In other words, the plug shaft 132 is fixedly connected to the first cylindrical ring 131 by means of the base 136. The arc-shaped curved surface 135 may be fitted to the circular outer circumferential surface of the first toothed disc 108 and the circular outer circumferential surface of the second adapter 113. The arc-shaped curved surface 135 provides a certain supporting effect for the first toothed disc 108 and the second adapter 113.

In an optional solution of this embodiment, there are at least three positioning grooves 134. The second button comprises a first columnar portion 137 and a second columnar portion 138 connected to the first columnar portion 137. The axis of the first columnar portion 137 is perpendicular to the axis of the second columnar portion 138. The first columnar portion 137 abuts against an elastic return member 139 for allowing detachment of the second columnar portion from one of the positioning grooves 134 when the first columnar portion 137 is pressed, so that the second adapter 113 is rotatable relative to the first adapter 112.

The primary supporting leg 101 has a button hole 140 and a lateral hole 141. The lateral hole 141 is provided in a hole wall of the button hole 140. The axial direction of the lateral hole 141 is perpendicular to the axial direction of the button hole 140. The first columnar portion 137 is plugged into the button hole 140. The second columnar portion 138 is plugged into the lateral hole 141. Since the second columnar portion 138 is plugged into the lateral hole 141 and the second columnar portion 138 is connected to the first columnar portion 137, the first columnar portion 137 will not be detached from the button hole 140. The elastic return member 139 may be a spring. The elastic return member 139 is mounted in the button hole 140 and abuts against one end of the first columnar portion 137. The lateral hole 141 may be a waist-shaped hole or a strip-shaped hole, so that when the first columnar portion 137 is pressed, the second columnar portion 138 is movable in the radial direction of the waist-shaped hole or the strip-shaped hole, thereby allowing an end portion of the second columnar portion inserted into a positioning groove 134 to be detached from the positioning groove 134. The first columnar portion 137 may be threadedly connected to the second columnar portion 138. When three positioning grooves 134 are provided, it is possible to achieve three changes in the angle between the primary supporting leg 101 and the secondary supporting leg.

It should be noted that there may also be two, four, five, or more positioning grooves 134 to meet the requirements of different occasions.

In an optional solution of this embodiment, the primary supporting leg 101 is fixedly connected to the second adapter 113, and they may be structurally integrated with each other. When unlocked by the second button, the end portion of the second columnar portion is detached from the positioning groove 134, so that the second adapter 113 can rotate relative to the first adapter 112 to adjust the opening angle between the primary supporting leg 101 and the secondary supporting leg.

In an optional solution of this embodiment, the supporting stand further comprises a shield 142. The shield 142 has a length extending in a direction in an arc shape, to fit the outer circumferential surface of the first cylindrical ring 131. The shield 142 can cover the plurality of positioning grooves 134 to avoid entry of foreign matters. The shield 142 has a protruding portion 143 at an end thereof, and the primary supporting leg 101 has a recessed portion 144 in an end surface of an end thereof. The protruding portion 143 is inserted into the recessed portion 144. The lower surface of the first head connector 104 has an arcuate surface 145. The shield 142 is positionally limited between the outer circumferential surface of the first cylindrical ring 131 and the arcuate surface 145 of the lower surface of the first head connector 104, so as to avoid detachment of the shield 142 from the supporting stand. When the primary supporting leg 101 is rotating relative to the first adapter 112, the shield 142 will be driven to rotate around the outer circumferential surface of the first cylindrical ring 131.

In an optional solution of this embodiment, an angle adjusting structure 40 is disposed between the first sub-leg 102 and the second sub-leg 103, to adjust the opening angle between the first sub-leg 102 and the second sub-leg 103. The angle adjusting structure 40 enables the opening or closing of the first sub-leg 102 relative to the second sub-leg 103 and allows the desired opening angle to be maintained with little change after the opening angle is adjusted. The angle adjusting structure 40 enables a fixed set angle to be formed between the first sub-leg and the second sub-leg after they are unfolded to each other.

As shown in FIGS. 9, 11, 12, 13, and 21, in an optional solution of this embodiment, the damping shaft 133 may be a component of the angle adjusting structure 40, and the outer circumferential surface of the damping shaft 133 has a first limiting groove 146 extending along its own axis.

One end of the first sub-leg 102 and one end of the second sub-leg 103 each have a damping hole 147. The inner wall of the damping hole 147 is provided with a first limiting rib 165 extending in its own axial direction. The damping shaft 133 passes through the damping hole 147 of the first sub-leg 102 and through the damping hole 147 of the second sub-leg 103, and the first limiting rib is positionally limited in the first limiting groove 146. The bottom of the first limiting groove is provided with a positioning clamping slot 166 which is close to a wall of the first limiting groove. Optionally, there may be two positioning clamping slots, and the two positioning clamping slots are located at the two opposite walls of the first limiting groove, respectively. When the first sub-leg and the second sub-leg are fully opened to form a set angle, the first limiting ribs will be caught in the positioning clamping slots, which allows the set angle formed between the first sub-leg and the second sub-leg to be maintained with little change. It should be noted that the damping shaft may be made of plastic, rubber, or silicone, so that the damping shaft is deformable to a certain extent. This contributes to the stability of the angle between the two sub-legs after the first limiting ribs are caught in the positioning clamping slots.

The damping shaft 133 may have a splined hole, and the outer surface of the plug shaft 132 may have external splines. In this way, after the plug shaft 132 is inserted into the splined hole of the damping shaft 133, the external splines on the plug shaft 132 are matched with internal splines in the splined hole, so that the damping shaft 133 and the plug shaft 132 can be circumferentially fixed to each other. One end of the first sub-leg 102 and one end of the second sub-leg 103 each have a disc-shaped structure 148 in which the damping hole 147 is provided. The disc-shaped structure 148 of the first sub-leg 102 is located between the disc-shaped structure 148 of the second sub-leg 103 and the base 136.

The axial direction of the plug shaft 132 is perpendicular to the axial direction of the shaft sleeve 125, which allows an axis of rotation of the primary supporting leg 101 relative to the secondary supporting leg 201 to be perpendicular to an axis of rotation of the first sub-leg 102 relative to the second sub-leg 103, thereby allowing formation of a three-leg support. The supporting stand which is placed on the ground will be described as an example for formation of a three-leg support. In the case of forming a three-leg support, the axis of rotation of the primary supporting leg 101 relative to the secondary supporting leg 201 may be parallel to the ground, and the axis of rotation of the first sub-leg 102 relative to the second sub-leg 103 is thus perpendicular to the ground. In this way, when the angle between the primary supporting leg 101 and the secondary supporting leg 201 is locked by the supporting leg adjusting structure, the image acquisition apparatus 200 placed on the first head connector 104 applies a downward force to the supporting stand. Since the axis of rotation of the first sub-leg 102 relative to the second sub-leg 103 is perpendicular to the ground, the first sub-leg and the second sub-leg are less likely to rotate relative to each other, thereby ensuring the stability and safety of the image acquisition apparatus 200 during use. In addition, a lengthened handheld mode can also be achieved by the perpendicularity of the axis of rotation of the primary supporting leg 101 relative to the secondary supporting leg 201 to the axis of rotation of the first sub-leg relative to the second sub-leg.

The angle adjusting structure 40 may further comprise a third nylon washer 149, a fourth nylon washer 150, a bottom cover 151, and a flat-headed screw 152. The third nylon washer 149 is located between the disc-shaped structure 148 of the first sub-leg 102 and the base 136, so that a certain damping force can be achieved during rotation of the first sub-leg 102. The fourth nylon washer 150 is located between the disc-shaped structure 148 of the second sub-leg 103 and the disc-shaped structure 148 of the first sub-leg 102, so that a certain damping force can be achieved during the rotation of the first sub-leg 102 and the second sub-leg 103. The bottom cover 151 is fixedly connected to the plug shaft 132 by means of the flat-headed screw 152, and the bottom cover 151 has a recessed hole 153 which is provided with internal splines matching with external splines on the outer surface of the plug shaft 132. This can avoid the bottom cover 151 from rotating along with the second sub-leg 103 to loosen the flat-headed screw 152. The bottom cover 151 can prevent detachment of the first sub-leg 102 and the second sub-leg 103 from the plug shaft 132. The disc-shaped structure 148 of the first sub-leg 102 has a disc surface angled relative to the direction of extension of the length of the first sub-leg 102, and the disc-shaped structure 148 of the second sub-leg 103 has a disc surface angled relative to the direction of extension of the length of the second sub-leg 103. In this way, when the primary supporting leg 101 and the secondary supporting leg are closed, a user or other scenes or objects can be well photographed by the image acquisition apparatus 200 on the first head connector 104 when the user is holding the primary supporting leg 101 and the secondary supporting leg in his or her hand.

Figure 22:
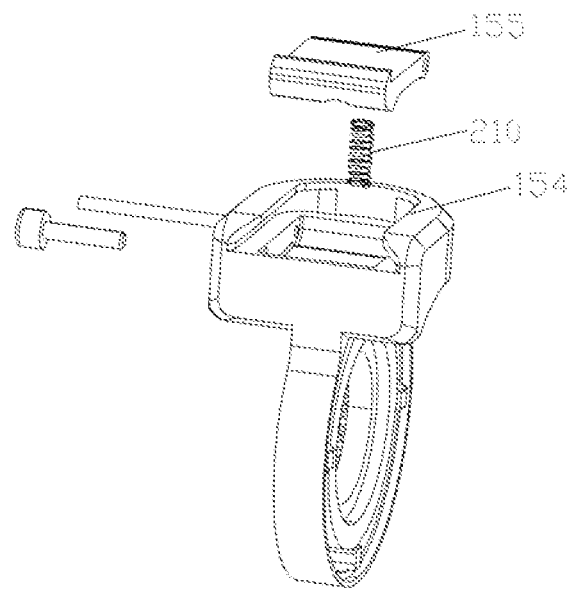
FIG. 22 is a schematic structural view showing the assembling relationship among a first plug groove, a first stop block, and a second elastic member of a first head connector according to an embodiment of the present disclosure.
Figure 23:
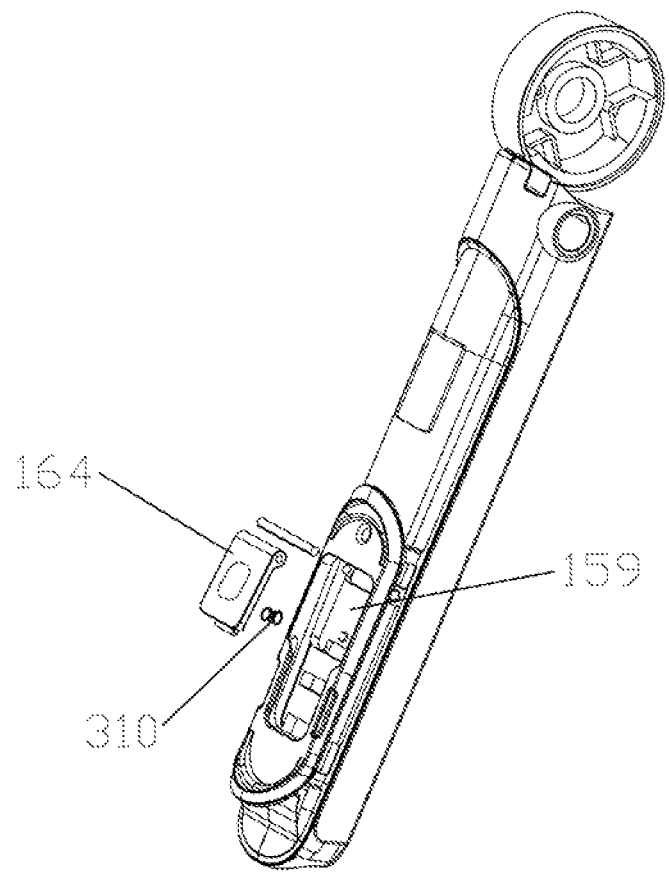
FIG. 23 is a schematic structural view showing the assembling relationship among a second plug groove, a second stop block, and a third elastic member of a second head connector according to an embodiment of the present disclosure.
Figure 24:
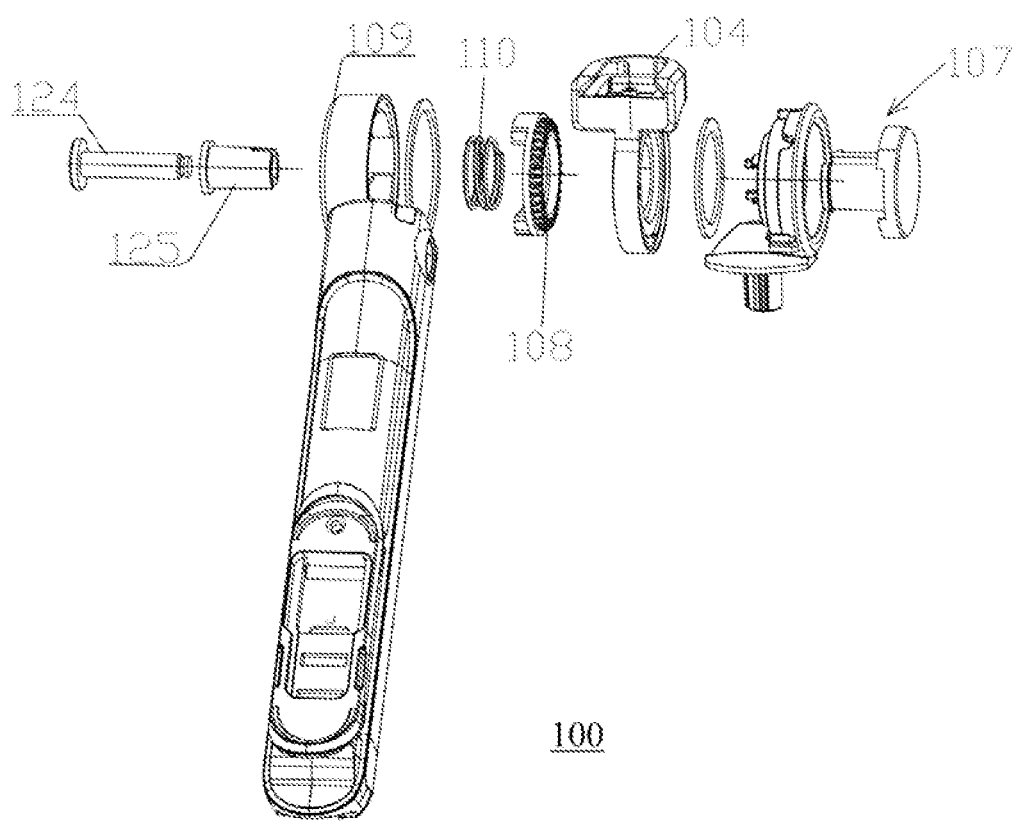
FIG. 24 is a schematic structural view of a rotating assembly according to an embodiment of the present disclosure.

In an optional solution of this embodiment, as shown in FIG. 22, the first head connector 104 is provided with a first plug groove 154, the first plug groove 154 has an insertion port provided with a first stop block 155, and the first stop block 155 is configured to be stretchable or retractable under the elastic action of a second elastic member 210. The second elastic member 210 enables stable mounting of an external device mounted to the first head connector 104, so as to avoid detachment of the external device from the first plug groove 154. Similarly, the second head connector 105 is provided with a second plug groove 159, the second plug groove 159 has an insertion port provided with a second stop block 164, and the second stop block 164 is configured to be stretchable or retractable under the elastic action of a third elastic member 310. The third elastic member 310 enables stable mounting of an external device mounted to the second head connector 105, so as to avoid detachment of the external device from the second plug groove 159. Both the first plug groove 154 and the second plug groove 159 may be dovetail grooves or wedge-shaped grooves capable of achieving the same function. Both the second elastic member 210 and the third elastic member 310 may be springs.

One end of the first stop block 155 is rotatably connected to the first head connector 104 by means of a first pin shaft 156, and the second elastic member 210 may be positionally limited between the first stop block 155 and the bottom of the first plug groove 154 by means of a second pin shaft 157 at the other end of the first stop block 155. In this way, when the other end of the first stop block 155 is pressed, the first stop block 155 may be moved downward and thus retracted. When the first stop block 155 is released, the first stop block 155 may be moved upward to achieve the stretched state, so that an external device mounted to the first head connector 104 is positioned in place. The second pin shaft 157 is located in a hole which is a waist-shaped hole, i.e., a hole having a waist-shaped cross section, so that the second pin shaft 157 may move in the radial direction of the waist-shaped hole when the first stop block 155 is pressed down.

One end of the second stop block 164 is rotatably connected to the second head connector 105 by means of a third pin shaft, and the third elastic member 310 may be positionally limited between the second stop block 164 and the bottom of the second plug groove 159 by means of a stop portion at the other end of the second stop block 164. In this way, when the other end of the second stop block 164 is pressed, the second stop block 164 may be moved downward and thus retracted. When the second stop block 164 is released, the second stop block 164 may be moved upward to achieve the stretched state, so that an external device mounted to the second head connector 105 is positioned in place. A leg cover 160 may be mounted at the second plug groove 159, so that the leg cover 160 may be removably connected, by snap-fit, to the second plug groove 159 when the second head connector 105 is not used.

In an optional solution of this embodiment, the stopper 106 is disposed at the opposite other end of the primary supporting leg 101, and the stopper 106 is rotatable relative to the primary supporting leg 101 to form a hook structure in cooperation with the primary supporting leg 101.

The stopper 106 is rotatably mounted at one end of the primary supporting leg 101 by means of a fifth pin shaft 162. The primary supporting leg 101 has a sunken groove 163, and the stopper 106 is rotatable to be received in the sunken groove 163 and is rotatable out of the sunken groove 163, to form a hook structure in cooperation with the primary supporting leg 101. The stopper 106 may have a plate-like structure. When the stopper 106 is rotated out of the sunken groove 163, the stopper 106 can be stopped by a wall of the sunken groove 163, so that a first angle less than or equal to 90 degrees is formed between the length direction of the stopper 106 and the length direction of the primary supporting leg 101. Optionally, the first angle may be 60 degrees to 70 degrees. The plate-like structure is hinged to the primary supporting leg 101 at one end thereof, and the plate-like structure has a positioning block on the plate surface at the other end thereof. When the stopper 106 is received in the sunken groove 163, the positioning block faces the bottom of the sunken groove 163. The end surface of the free end of the plate-like structure may have a pull structure so that the plate-like structure can be pulled out of the sunken groove 163 by hand. The pull structure may be a grooved structure or a handle. The first sub-leg 102 and the second sub-leg 103 can be closed toward each other, and the primary supporting leg 101 and the secondary supporting leg can be closed toward each other, so that the primary supporting leg 101, the first sub-leg 102, and the second sub-leg 103 are closed together to form a whole supporting leg. When in use, the whole supporting leg may be held in a hand to achieve photographing. It should be noted that when the plate surface at the other end of the plate-like structure has a positioning block or any other component that can form a hook structure with the plate-like structure, the first angle formed between the length direction of the stopper 106 and the length direction of the primary supporting leg 101 may be greater than 90 degrees.

The supporting stand according to this embodiment has a head adjusting structure, an angle adjusting structure, and a supporting leg adjusting structure integrated together, so that the three structures may be operated independently or operated in cooperation, to achieve different requirements of usage, so that the supporting stand has a handheld mode, a high-position three-leg support mode, a low-position three-leg support mode, a lengthened handheld mode, and a hung mode.

1. Handheld Mode (see FIG. 14)

The primary supporting leg 101, the first sub-leg, and the second sub-leg are closed together by adjusting the angle adjusting structure and the supporting leg adjusting structure. The image acquisition apparatus 200 may be mounted on the first head connector 104. A user may hold the whole supporting leg in his or her hand. The pitch angle may be adjusted by the head adjusting structure in order to meet the required pitch angle of the image acquisition apparatus 200.

2. High-Position Three-Leg Support Mode (See FIG. 15)

After the handheld mode lasts for a long time or in order to achieve a three-leg support, the opening angle between the primary supporting leg 101 and the secondary supporting leg 201 may be adjusted by adjusting the supporting leg adjusting structure 20, and the opening angle between the first sub-leg 102 and the second sub-leg 103 may be adjusted by the angle adjusting structure 40, so that a high-position three-leg support mode can be achieved.

3. Low-Position Three-Leg Support Mode (See FIG. 16)

When it is necessary to take a photo or video at a lower height position, the opening angle between the primary supporting leg 101 and the secondary supporting leg 201 may be increased by adjusting the supporting leg adjusting structure, and at the same time the opening angle between the first sub-leg 102 and the second sub-leg 103 may be increased by the angle adjusting structure 40. The low-position three-leg support mode is more stable and also facilitates obtaining of a close-up viewing angle at a lower position.

4. Hung Mode (See FIGS. 17 and 18)

When the supporting stand is used in a three-leg support, the stopper 106 may be rotated out of the sunken groove 163, and the hook structure may be hung on a host 300 such as a board-shaped object, thereby achieving a stable support structure formed by two sub-legs and one hook structure. This allows the fixation of the image acquisition apparatus 200 in a hung manner so that it can be used in multiple scenarios such as indoor or outdoor environments, and photography can be implemented in a narrow and small space.

5. Lengthened Handheld Mode (See FIG. 19)

The image acquisition apparatus 200 is mounted on the second head connector 105, and then the opening angle between the primary supporting leg 101 and the secondary supporting leg 201 is adjusted by the supporting leg adjusting structure 20, and the secondary supporting leg is held in the user's hand for photographing. The primary supporting leg 101 and the secondary supporting leg 201 may be opened at an angle of 140 degrees, which conforms to ergonomics in full consideration of the photographing angle of view and comfort of a human body gripping the secondary supporting leg. In the lengthened handheld mode, a wider scene to be shot can be quickly obtained, and a self-photographing experience is greatly optimized.

An embodiment of the present disclosure further provides a rotating assembly 100, which comprises a head adjusting structure as described above and a supporting leg adjusting structure 20 as described above. The supporting leg adjusting structure comprises the first adapter 112 and the second adapter 113. The supporting stand according to an embodiment of the present disclosure comprises the rotating assembly. In the rotating assembly according to this embodiment, the angle of the first head connector 104 fixedly connected to the first toothed disc 108 is adjusted by using the first button 107, the first toothed disc 108, the second toothed disc 109, and the first elastic member 110, so that the angle of an external device, such as an image acquisition apparatus 200, mounted to the first head connector 104 can be adjusted without using a separate head, which contributes to cost saving.

An embodiment of the present disclosure further provides a photographing device, which comprises an image acquisition apparatus 200 and the supporting stand as described above. The image acquisition apparatus 200 is mounted on the supporting stand. The image acquisition apparatus 200 may be an apparatus capable of capturing images or videos, such as a camera, a video camera, a mobile phone, or a camera unit. After the image acquisition apparatus 200 is mounted on the supporting stand, the photographing device may have a handheld photographing mode, a high-position tripod photographing mode, a low-position tripod photographing mode, a lengthened handheld photographing mode, and a hung photographing mode.

In summary, the rotating assembly, the supporting stand, and the photographing device according to the embodiments of the present disclosure may be made of a combination of soft and hard rubber and metal materials, so that the resulting structure is highly reliable and allows stable photographing, has strong stability during use, and has multiple usage modes, including handheld, high-position, low-position, lengthened, and hung modes. Moreover, the different modes can be switched quickly from one to another, to meet the demand for creative photographing in multiple scenes and from multiple angles, thus the supporting stand of the present disclosure provides good user experience and is suitable for use in different application scenarios. In addition, the three legs can be easily unfolded or closed, which occupies small space and is easily carried. Moreover, the supporting stand can be easily disassembled and assembled and is designed to be handheld at an ergonomic angle, so that it can be handheld with less effort. The first head connector 104 and the second head connector 105 are provided with a first stop block 155 and a second stop block 164, respectively, so as to facilitate removal and mounting of the image acquisition apparatus 200 and facilitate the rapid switching of the image acquisition apparatus 200 to different positions on the supporting stand, so that the camera can be used over a wide field of view.

Finally, it should be noted that the above embodiments are merely intended to illustrate the technical solutions of the present disclosure, but not intended to limit the present disclosure. Although the present disclosure has been described in detail with reference to the foregoing embodiments, it should be understood by those of ordinary skill in the art that the technical solutions disclosed in the foregoing embodiments may still be modified, or some or all of the technical features thereof may be replaced with equivalents. Such modifications or replacements will not cause the essence of the corresponding technical solutions to depart from the scope of the technical solutions of the embodiments of the present disclosure. In the specification provided herein, numerous specific details are described. However, it can be understood that embodiments of the present disclosure may be implemented without these specific details. In some examples, well-known methods, structures and technologies are not shown in detail, so as not to obscure the understanding of this specification. In addition, it can be understood by those skilled in the art that while some embodiments described herein include some but not other features included in other embodiments, combinations of features of different embodiments are intended to lie within the scope of the present disclosure and form different embodiments.

INDUSTRIAL APPLICABILITY

The present disclosure provides a rotating assembly, a supporting stand, and a photographing device, in which a supporting leg adjusting structure and a head adjusting structure comprising components such as a first button, a first toothed disc, a second toothed disc, and a first elastic member are used to adjust the angle of a first head connector fixedly connected to the first toothed disc, so that the angle of an external device, such as an image acquisition apparatus, mounted to the first head connector can be adjusted without using a head, which contributes to cost saving.

What is claimed is:

1. A rotating assembly, comprising a head adjusting structure, wherein the head adjusting structure comprises a first button, a first toothed disc, a second toothed disc and a first elastic member, wherein the first toothed disc is connected with a first head connector, and the first elastic member is configured to enable teeth on the second toothed disc to mesh with teeth on the first toothed disc; and the first button is configured to overcome an elastic force of the first elastic member under an action of an external force, so that the teeth on the second toothed disc are disengaged from the teeth on the first toothed disc;

further comprising a first adapter and a second adapter, wherein the first adapter comprises a first cylindrical ring, wherein the first cylindrical ring has an outer circumferential surface provided with a plurality of positioning grooves distributed in an circumferential direction of the first cylindrical ring, and the second adapter is equipped with a second button, wherein the second button is configured to be positionally limited in a different one of the positioning grooves, so as to adjust an angle of rotation of the second adapter relative to the first adapter, and further comprising an angle adjusting structure, wherein the first adapter is a component of the angle adjusting structure, the angle adjusting structure further comprises a damping shaft, the first adapter further comprises a plug shaft fixedly connected to the outer circumferential surface of the first cylindrical ring, the plug shaft is connected to the damping shaft by being plugged therein, and the plug shaft and the damping shaft are circumferentially fixed to each other.

2. The rotating assembly according to claim 1, wherein the first head connector is fixedly connected to an outer circumferential surface of the first toothed disc.

3. The rotating assembly according to claim 1, wherein the first adapter further comprise a base having an arc-shaped curved surface, wherein the arc-shaped curved surface is located in an upper surface of the base, the first cylindrical ring is fixed to the upper surface of the base, and the arc-shaped curved surface is fitted to a circular outer circumferential surface of the first toothed disc and a circular outer circumferential surface of the second adapter.

4. The rotating assembly according to claim 1, wherein both the first toothed disc and the second toothed disc are located between the second adapter and the first adapter, wherein the second toothed disc is located between the first toothed disc and the second adapter.

5. The rotating assembly according to claim 1, wherein the first head connector is provided with a first plug groove, a first stop block is provided at an insertion port of the first plug groove, and the first stop block is configured to be stretchable or retractable under an elastic action of a second elastic member.

6. The rotating assembly according to claim 1, wherein the first button comprises a button cap and at least one button handle, wherein the at least one button handle has one end connected to the button cap, the first adapter has at least one socket configured to allow the at least one button handle to pass therethrough, and the at least one button handle has the other end abutting against a disc surface of the second toothed disc.

7. The rotating assembly according to claim 1, wherein the teeth on the second toothed disc are located on one side of the second toothed disc, and the second toothed disc has a guide post on the other opposite side of the second toothed disc; and the second adapter has one side provided with a guide groove, wherein the guide groove is matched with the guide post for guiding an axial movement of the second toothed disc.

8. The rotating assembly according to claim 7, wherein the second adapter has a shaft hole, and the guide groove is provided in a hole wall of the shaft hole.

9. The rotating assembly according to claim 8, wherein the first elastic member has one end abutting against a bottom of the shaft hole, and the other end abutting against a side of the second toothed disc on which the guide post is provided.

10. The rotating assembly according to claim 1, wherein at least three positioning grooves are provided, and the second button comprises a first columnar portion and a second columnar portion connected to the first columnar portion, wherein an axis of the first columnar portion is perpendicular to an axis of the second columnar portion; and the first columnar portion abuts against an elastic return member, such that the second columnar portion is able to be detached from one of the positioning grooves when the first columnar portion is pressed, so that the second adapter is rotatable relative to the first adapter.

11. The rotating assembly according to claim 1, wherein the head adjusting structure further comprises a first nylon washer, a second nylon washer, a retaining screw, a threaded sleeve, a locking screw, and a shaft sleeve, wherein the first nylon washer is located between the first adapter and the first toothed disc, the second nylon washer is sandwiched between the first toothed disc and the second adapter, the shaft sleeve has a stop cap being in contact with a side of the second adapter, the locking screw passes through a sleeve hole of the shaft sleeve and then is threadedly connected to an internal thread of the threaded sleeve, and the retaining screw is threadedly connected into a threaded hole provided at an end portion of the locking screw.

12. The rotating assembly according to claim 1, wherein the angle adjusting structure further comprises a third nylon washer, a fourth nylon washer, a bottom cover, and a flat-headed screw, wherein the third nylon washer is configured to be located between a disc-shaped structure of a first sub-leg of a secondary supporting leg of a supporting stand and a base of the first adapter, so as to achieve a damping force during rotation of the first sub-leg, the fourth nylon washer is configured to be located between a disc-shaped structure of a second sub-leg of the secondary supporting leg of the supporting stand and the disc-shaped structure of the first sub-leg, so as to achieve a damping force during rotation of the first sub-leg and the second sub-leg, and the bottom cover is fixedly connected to the plug shaft of the first adapter through the flat-headed screw.

13. A supporting stand, comprising the rotating assembly according to claim 1.

14. The supporting stand according to claim 13, further comprising a primary supporting leg and a secondary supporting leg, wherein the primary supporting leg is fixedly connected to the second adapter; and the secondary supporting leg is connected to the first adapter.

15. A photographing device, comprising an image acquisition apparatus and the supporting stand according to claim 13, wherein the image acquisition apparatus is mounted on the supporting stand.

* * * * *